US012557201B2

United States Patent
Ogi et al.

(10) Patent No.: US 12,557,201 B2
(45) Date of Patent: Feb. 17, 2026

(54) RADIATION IRRADIATION DEVICE

(71) Applicant: FUJIFILM Corporation, Tokyo (JP)

(72) Inventors: Kazuyuki Ogi, Kanagawa (JP);
Takeyasu Kobayashi, Kanagawa (JP);
Naoyuki Nishino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 181 days.

(21) Appl. No.: 18/537,751

(22) Filed: Dec. 12, 2023

(65) Prior Publication Data

US 2024/0215138 A1   Jun. 27, 2024

(30) Foreign Application Priority Data

Dec. 27, 2022   (JP) .................. 2022-210692

(51) Int. Cl.
*H05G 1/02* (2006.01)
*H05G 1/30* (2006.01)

(52) U.S. Cl.
CPC ................. *H05G 1/02* (2013.01); *H05G 1/30* (2013.01)

(58) Field of Classification Search
None
See application file for complete search history.

(56) References Cited

U.S. PATENT DOCUMENTS

| 6,256,060 | B1* | 7/2001 | Wakui | H04N 1/2112 |
| | | | | 348/374 |
| 7,009,637 | B2* | 3/2006 | Sawachi | H04N 1/2112 |
| | | | | 348/E5.025 |
| 2007/0230659 | A1 | 10/2007 | Turner | |
| 2019/0380671 | A1* | 12/2019 | Sato | A61B 6/4405 |

FOREIGN PATENT DOCUMENTS

WO   2018/159011 A1   9/2018

OTHER PUBLICATIONS

The extended European search report issued by the European Patent Office on May 24, 2024, which corresponds to European Patent Application 23214451.9, and is related to U.S. Appl. No. 18/537,751.
Communication pursuant to Article 94(3) EPC issued by the European Patent Office on Jul. 25, 2025, which corresponds to European Patent Application No. 23214451.9-1122 and is related to U.S. Appl. No. 18/537,751.

* cited by examiner

*Primary Examiner* — Hoon K Song
(74) *Attorney, Agent, or Firm* — Studebaker Brackett PLLC

(57) ABSTRACT

A radiation irradiation device includes a device main body that is provided with an irradiation window for emitting radiation; a remote operation unit that is capable of remotely operating the device main body and of which an outer peripheral surface is composed of a plurality of surfaces; and an accommodation portion that is provided in the device main body, accommodates the remote operation unit in a form of being embedded in a main body outer peripheral surface, which is an outer peripheral surface of the device main body, and has a recessed inner wall surface facing an entire surface excluding one surface in the outer peripheral surface of the remote operation unit.

6 Claims, 13 Drawing Sheets

RADIATION IRRADIATION DEVICE

CROSS-REFERENCE TO RELATED APPLICATION

This application claims priority from Japanese Patent Application No. 2022-210692, filed Dec. 27, 2022, the disclosure of which is incorporated herein by reference in its entirety.

BACKGROUND

Technical Field

The present disclosure relates to a radiation irradiation device.

Related Art

WO2018/159011A discloses a radiation irradiation device comprising a radiation generation unit that generates radiation, and a switch unit that controls emission of the radiation from the radiation generation unit. The radiation generation unit and the switch unit are composed of separate housings, and the radiation generation unit and the switch unit are configured to be attachable and detachable via a partial surface of each housing.

In the radiation irradiation device, a remote operation unit for remotely operating a device main body may be provided separately from the device main body. In WO2018/159011A, the radiation generation unit and the switch unit (corresponding to the remote operation unit) are separate housings and are attachable and detachable via a partial surface of each housing. For example, the switch unit receives an input for causing the radiation generation unit to emit the radiation. Further, the switch unit is transported integrally with the radiation generation unit in a case where the radiation irradiation device is transported.

However, in the technology disclosed in WO2018/159011A, a plurality of surfaces of the switch unit are exposed without being covered with a housing of a radiation irradiation unit in a state in which the switch unit is attached to the radiation irradiation unit. For this reason, depending on a fixing method of the switch unit, the switch unit may easily come off, so that attachment of the switch unit to the radiation irradiation unit may be unstable.

SUMMARY

The technology of the present disclosure provides a radiation irradiation device that can accommodate a remote operation unit in a stable state as compared with a case where the remote operation unit is accommodated in a state in which a plurality of surfaces of the remote operation unit are exposed.

A first aspect according to the technology of the present disclosure is a radiation irradiation device comprising: a device main body that is provided with an irradiation window for emitting radiation; a remote operation unit that is capable of remotely operating the device main body and of which an outer peripheral surface is composed of a plurality of surfaces; and an accommodation portion that is provided in the device main body, accommodates the remote operation unit in a form of being embedded in a main body outer peripheral surface, which is an outer peripheral surface of the device main body, and has a recessed inner wall surface facing an entire surface excluding one surface in the outer peripheral surface of the remote operation unit.

A second aspect according to the technology of the present disclosure is the radiation irradiation device according to the first aspect, in which an operation key for inputting an operation instruction is provided on the one surface.

A third aspect according to the technology of the present disclosure is the radiation irradiation device according to the first aspect, in which an operation key for inputting an operation instruction is not provided on the one surface, and the operation key is provided on a surface other than the one surface.

A fourth aspect according to the technology of the present disclosure is the radiation irradiation device according to the first aspect, in which at least an outer edge portion of the one surface has the same height as the main body outer peripheral surface in a state in which the remote operation unit is accommodated in the accommodation portion.

A fifth aspect according to the technology of the present disclosure is the radiation irradiation device according to the first aspect, in which at least a part of an inner peripheral edge of the accommodation portion is provided with a recess for finger hook.

A sixth aspect according to the technology of the present disclosure is the radiation irradiation device according to the first aspect, in which the accommodation portion accommodates the remote operation unit in a state in which an entire region of the entire surface excluding the one surface is covered with the inner wall surface.

A seventh aspect according to the technology of the present disclosure is the radiation irradiation device according to the first aspect, in which the device main body includes a holding mechanism that holds the remote operation unit in an accommodated state of being accommodated in the accommodation portion.

An eighth aspect according to the technology of the present disclosure is the radiation irradiation device according to the seventh aspect, in which a holding force of the holding mechanism for holding the remote operation unit is released by a pushing operation of pushing the remote operation unit toward a back of the accommodation portion or by an operation of an operation key disposed outside the accommodation portion.

A ninth aspect according to the technology of the present disclosure is the radiation irradiation device according to the first aspect, in which in a case where a surface on which the irradiation window is provided in the main body outer peripheral surface is defined as a front surface, the accommodation portion is provided on a surface other than the front surface in the main body outer peripheral surface.

A tenth aspect according to the technology of the present disclosure is the radiation irradiation device according to the ninth aspect, in which the accommodation portion is provided on a rear surface on a side opposite to the front surface.

An eleventh aspect according to the technology of the present disclosure is the radiation irradiation device according to the first aspect, in which in a case where a surface on which the irradiation window is provided in the main body outer peripheral surface is defined as a front surface, the accommodation portion is provided on the front surface in the main body outer peripheral surface.

The technology of the present disclosure can provide a radiation irradiation device that can accommodate the remote operation unit in a stable state as compared with a case where the remote operation unit is accommodated in a state in which a plurality of surfaces of the remote operation unit are exposed.

DETAILED DESCRIPTION

Hereinafter, an embodiment of the present disclosure will be described in detail with reference to the drawings.

In the following description, for convenience of explanation, a height direction, a width direction, and a front-rear direction (also referred to as a depth direction) of a radiation irradiation device 10 are indicated by three arrows X, Y, and Z. First, the height direction is indicated by the arrow Z, an arrow Z direction pointed by the arrow Z is an upward direction of the radiation irradiation device 10, and an opposite direction of the upward direction is a downward direction. The height direction is a vertical direction. The width direction is indicated by the arrow X orthogonal to the arrow Z, a direction pointed by the arrow X is a right direction of the radiation irradiation device 10, and an opposite direction of the right direction is a left direction. The front-rear direction is indicated by the arrow Y orthogonal to the arrow Z and the arrow X, a direction pointed by the arrow Y is a front direction of the radiation irradiation device 10, and an opposite direction of the front direction is a rear direction. That is, in the radiation irradiation device 10, an emission direction of the radiation is the front direction, and a side on which a subject A stands (see FIG. 1) is the front direction. In addition, in the following, expressions using sides such as an upper side, a lower side, a left side, a right side, a front side, and a rear side have the same meanings as the expressions using the directions.

In the present embodiment, a "vertical direction" refers not only to a perfect vertical direction but also to a vertical direction in the sense of including an error that is generally acceptable in the technical field to which the technology of the present disclosure belongs and that does not contradict the concept of the technology of the present disclosure. The same applies to a "horizontal direction". The "horizontal direction" refers not only to a perfect horizontal direction but also to a horizontal direction in the sense of including an error that is generally acceptable in the technical field to which the technology of the present disclosure belongs and that does not contradict the concept of the technology of the present disclosure.

Further, in the present embodiment, "the same" refers to the same in the sense of including an error generally allowed in the technical field to which the technology of the present disclosure belongs, which is the error to the extent that it does not contradict the purpose of the technology of the present disclosure, in addition to the exact same.

Figure 1:
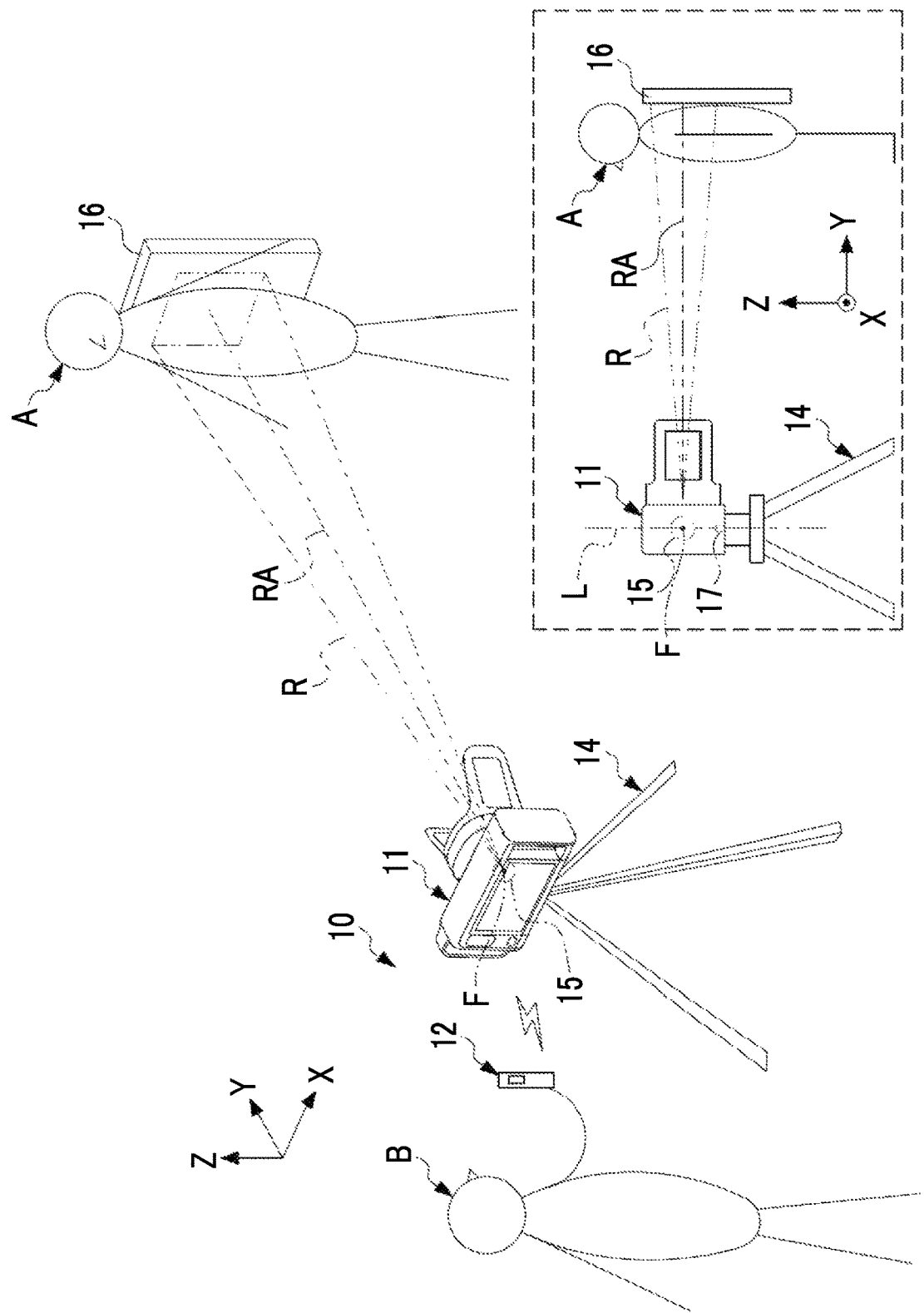
FIG. 1 is a perspective view showing an example of a usage state of a radiation irradiation device.

As shown in FIG. 1 as an example, the radiation irradiation device 10 comprises a device main body 11 and a remote operation unit 12. The device main body 11 is a device that can irradiate the subject A with radiation R. The device main body 11 comprises a radiation tube 15, which is a generation source of the radiation, inside thereof and emits the radiation (for example, X-rays or γ-rays) generated in the radiation tube 15 toward the subject A via an irradiation field limiter (see FIG. 3), an irradiation window (see FIG. 3), and the like. The radiation irradiation device 10 is an example of a "radiation irradiation device" according to the technology of the present disclosure, the device main body 11 is an example of a "device main body" according to the technology of the present disclosure, and the remote operation unit 12 is an example of a "remote operation unit" according to the technology of the present disclosure.

The radiation irradiation device 10 has a portable size and weight. That is, the radiation irradiation device 10 is a portable radiation irradiation device. The radiation irradiation device 10 may be used, for example, in a simple radiographic examination at a medical facility or may be used in a radiographic examination during home medical care. In addition, the radiation irradiation device 10 may be used outdoors. For example, the radiation irradiation device 10 may be used for an on-site medical care in a disaster-stricken area or a medically underserved area.

The device main body 11 is set at a predetermined position (height and distance) with respect to the subject A via, for example, a tripod 14. A fixing portion 17 for fixing the tripod 14 and the device main body 11 is provided on a lower surface of the device main body 11. The fixing portion 17 is, for example, a screw hole. The fixing portion 17 is located on a straight line L which is orthogonal to a central axis RA of a flux of the radiation R and passes through a focus F of the radiation tube 15. The radiation tube 15 generates the radiation R, for example, by colliding electrons emitted from a cathode with a target. The focus F is a position where the electrons collide on the target. The flux of the radiation R spreads in a conical shape with the focus F as a base point. The central axis RA is a central axis of such a flux. The fixing portion 17 is provided at a position where the straight line L and the lower surface of the device main body 11 intersect. In the radiation irradiation device 10, a portion in which the focus F of the radiation tube 15 is located is close to a centroid. The fixing portion 17 is provided on the straight line L, which makes it easy to stabilize the radiation irradiation device 10 on the tripod 14.

The remote operation unit 12 is a device that can remotely operate the device main body 11. The remote operation unit 12 is attachable to and detachable from the device main body 11. The remote operation unit 12 remotely operates the device main body 11, for example, by communicating with the device main body 11. The remote operation by the remote operation unit 12 includes, for example, an operation of causing the device main body 11 to emit the radiation R toward the subject A. A wireless communication standard between the remote operation unit 12 and the device main body 11 is, for example, Bluetooth (registered trademark). Of course, infrared communication may be used.

A user B, who is an operator of the radiation irradiation device 10, takes out the remote operation unit 12 from the device main body 11 and then operates the remote operation unit 12 in a state of being separated from the device main body 11 by a predetermined distance. As a result, the radiation R is emitted from the radiation tube 15 of the device main body 11 to the subject A. The radiation R transmitted through the subject A is detected by a detector 16.

Further, the user B accommodates the remote operation unit 12 in the device main body 11 after completing imaging using the radiation irradiation device 10. In a state in which the remote operation unit 12 is accommodated in the device main body 11, the radiation irradiation device 10 is carried by the user B or is stored in a storage case of the radiation irradiation device 10.

Figure 2:
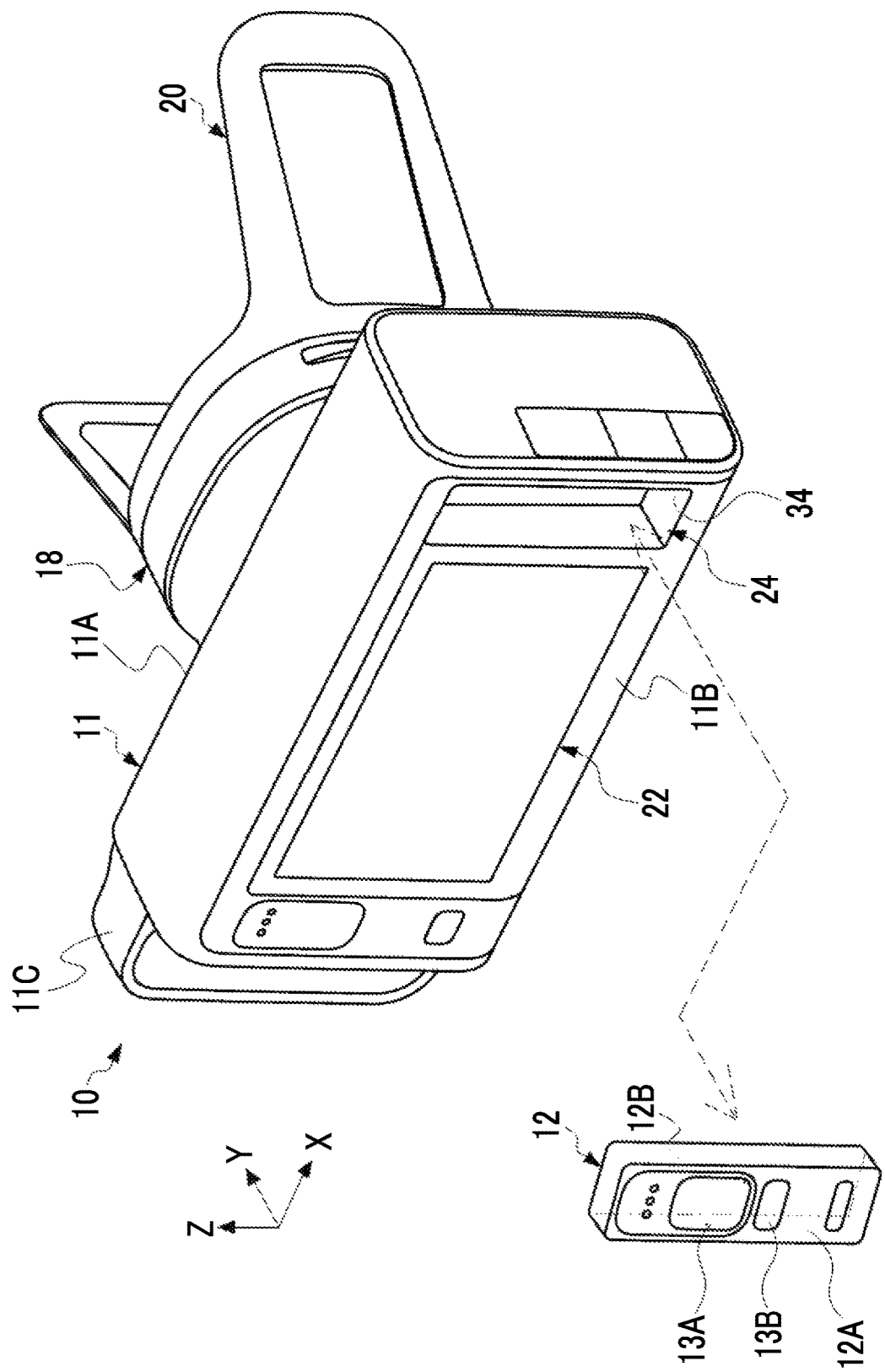
FIG. 2 is an external perspective view showing an example of a configuration of the radiation irradiation device.

As shown in FIG. 2 as an example, the device main body 11 has a substantially rectangular parallelepiped shape having a longitudinal direction in a left-right direction. A tubular portion 18 that protrudes toward an emission direction of the radiation R is provided on a front surface 11A of the device main body 11. The irradiation field limiter (also called a collimator) and the irradiation window, which will be described later, are attached inside the tubular portion 18. Further, a skin guard 20 is attached to a distal end of the tubular portion 18. The skin guard 20 is used to ensure a necessary space between the device main body 11 and the subject A, and prevents the subject A from being irradiated with the radiation R in a state in which the device main body 11 is too close to the subject A.

An accommodation portion 24 is provided on a rear surface 11B of the device main body 11. The accommodation portion 24 accommodates the remote operation unit 12 in a form in which the remote operation unit 12 is embedded in the rear surface 11B of the device main body 11. Specifically, the accommodation portion 24 has a recessed inner wall surface 34. In a state in which the remote operation unit 12 is accommodated in the accommodation portion 24, the inner wall surface 34 faces all surfaces of the remote operation unit 12 except for a back surface 12B. As described above, the accommodation portion 24 accommodates the remote operation unit 12. The accommodation portion 24 is an example of an "accommodation portion" according to the technology of the present disclosure, and the inner wall surface 34 is an example of an "inner wall surface" according to the technology of the present disclosure. The back surface 12B is an example of "one surface" according to the technology of the present disclosure, and the rear surface 11B is an example of a "main body outer peripheral surface" according to the technology of the present disclosure.

A display 22 is provided on the rear surface 11B of the device main body 11. The display 22 displays various types of information (for example, imaging conditions) related to imaging. Further, a grip member 11C is attached to a left side surface of the device main body 11. The user B grips the radiation irradiation device 10 via the grip member 11C.

The remote operation unit 12 has a substantially rectangular parallelepiped shape having a longitudinal direction in an up-down direction in a state of being accommodated in the device main body 11. The remote operation unit 12 has an operation surface 12A and the back surface 12B. An irradiation button 13A and an imaging button 13B are provided on the operation surface 12A. The irradiation button 13A and the imaging button 13B are examples of "operation keys" according to the technology of the present disclosure.

The irradiation button 13A is an operation button for giving an instruction for the irradiation with the radiation R. In a case where the irradiation button 13A is pressed by the user B, a signal for irradiating with the radiation R is output from the remote operation unit 12 to the device main body 11. In addition, an optical camera (not shown) is built into the radiation irradiation device 10. The imaging button 13B is an operation button for giving an instruction for imaging by the optical camera. In a case where the imaging button 13B is pressed by the user B, a signal for causing an optical camera, which will be described later, to perform imaging is output from the remote operation unit 12 to the device main body 11. The back surface 12B is a surface opposite to the operation surface 12A, and operation keys including the irradiation button 13A and the imaging button 13B are not provided on the back surface 12B.

Here, an example in which the irradiation button 13A and the imaging button 13B are buttons has been described, but this is merely an example. The irradiation button 13A and the imaging button 13B may be cursors, slide switches, or touch pads.

Figure 3:
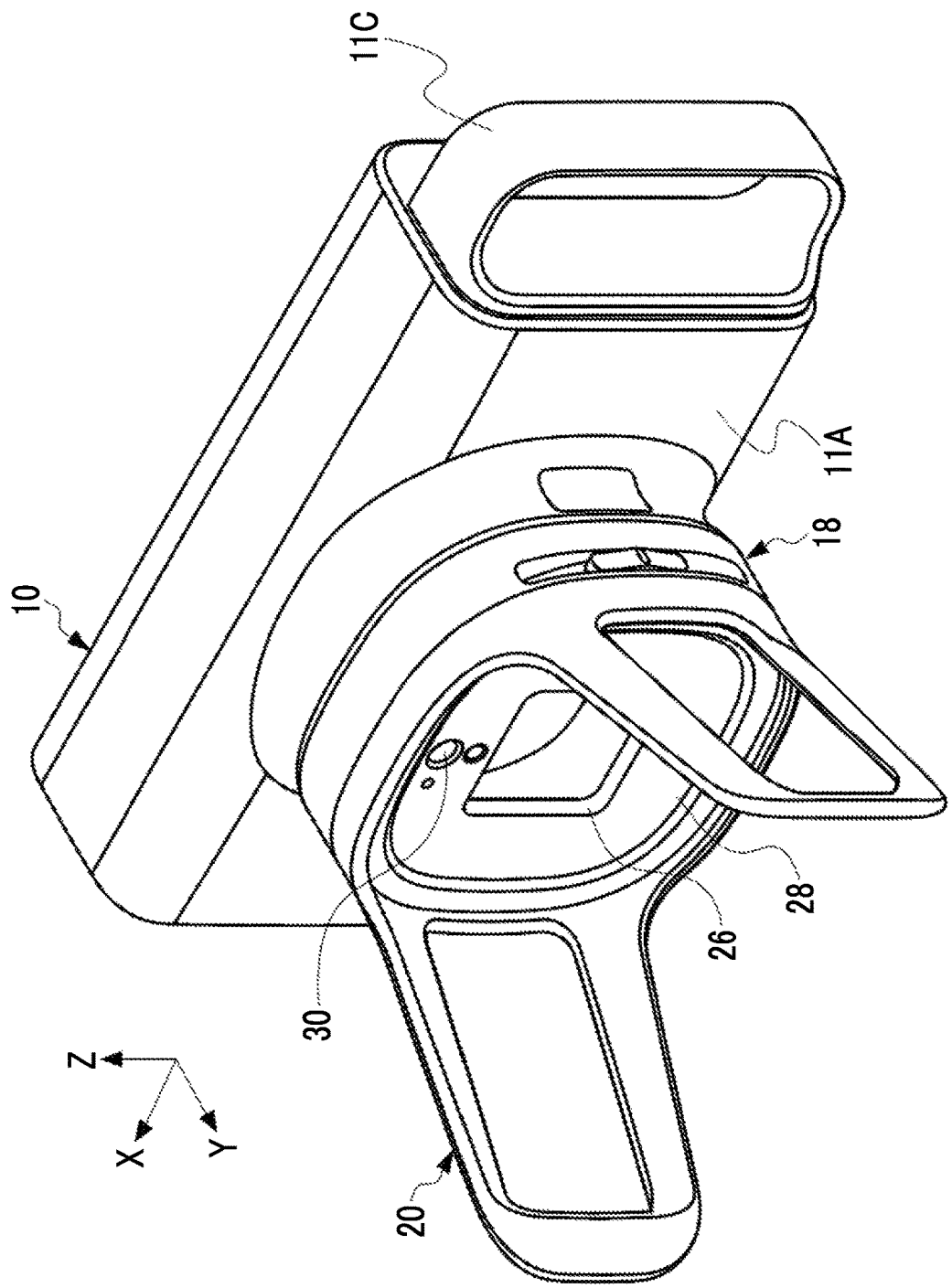
FIG. 3 is an external perspective view showing an example of the configuration of the radiation irradiation device.

As shown in FIG. 3 as an example, the tubular portion 18 protruding from the front surface 11A of the device main body 11 has an irradiation field limiter 26 and an irradiation window 28. The irradiation field limiter 26 is an irradiation field limiter that defines an irradiation range of the radiation R to a predetermined range. In addition, the irradiation window 28 is a window member that is made of a member transparent to the radiation R and partitions an outside and an inside of the tubular portion 18. The radiation R emitted from the radiation tube 15 has an irradiation range defined by the irradiation field limiter 26 and is emitted from the irradiation window toward the subject A. The irradiation window 28 is an example of an "irradiation window" according to the technology of the present disclosure. In addition, an optical camera (not shown) is provided in the tubular portion 18. The optical camera is, for example, an imaging device having an image sensor such as a charge coupled device (CCD) image sensor and a complementary metal-oxide-semiconductor (CMOS) image sensor. Reference 30 denotes an imaging window that is a part of a lens of the optical camera. Image light of the subject A is incident on the image sensor in the optical camera through the imaging window 30. The optical camera images, for example, the subject A. An optical image of the imaged subject A is used to perform registration of an irradiation position of the radiation R.

Figure 4:
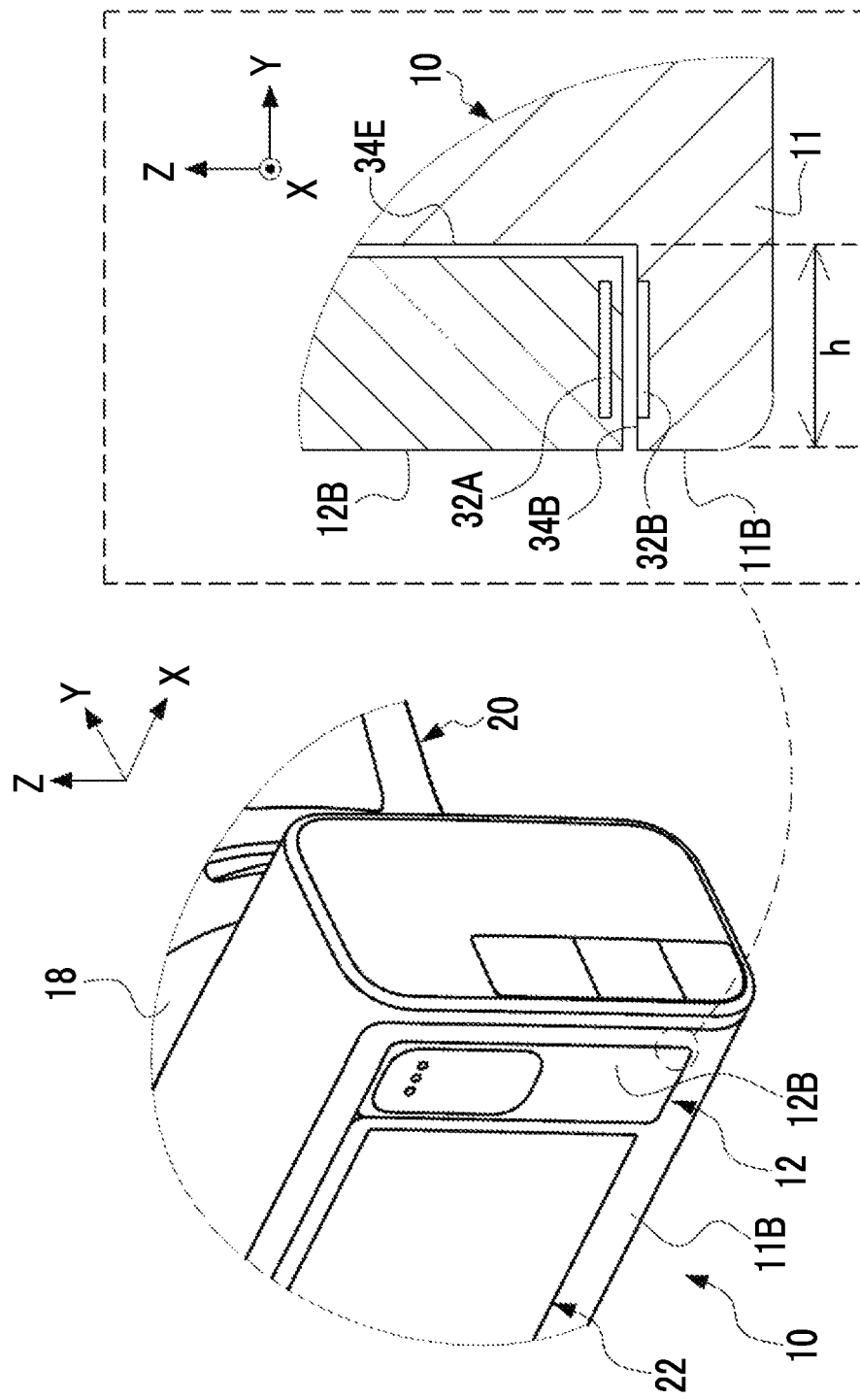
FIG. 4 is a partially enlarged view showing an example of the configuration of the radiation irradiation device.

As shown in FIG. 4 as an example, the remote operation unit 12 is accommodated in the accommodation portion 24 in a form of being embedded in the device main body 11. In an accommodated state, only the back surface 12B, which is a surface on a side opposite to the operation surface 12A of the remote operation unit 12, is exposed to the outside. In other words, the inner wall surface 34 of the accommodation portion 24 faces an entire surface excluding the back surface 12B in an outer peripheral surface of the remote operation unit 12.

Therefore, the remote operation unit 12 and the device main body 11 become more integrated in appearance, and the appearance of the radiation irradiation device 10 in a state in which the remote operation unit 12 is accommodated may be improved.

The radiation irradiation device 10 comprises a holding mechanism 32 that holds the remote operation unit 12 in an accommodated state. The holding mechanism 32 is an example of a "holding mechanism" according to the technology of the present disclosure. The holding mechanism 32 comprises a magnet 32A and a magnetized member 32B. The magnet 32A is provided at a lower portion of the remote operation unit 12. Further, the magnetized member 32B is provided on a lower surface 34B in the accommodation portion 24. That is, in a state in which the remote operation unit 12 is accommodated, the magnet 32A and the magnetized member 32B are provided at positions facing each other. In a case where the remote operation unit 12 is accommodated in the accommodation portion 24, the remote operation unit 12 is held in the accommodated state by a magnetic attractive force between the magnet 32A and the magnetized member 32B.

Here, an example of holding by attraction between the magnet 32A provided at the lower portion of the remote operation unit 12 and the magnetized member 32B provided on the lower surface of the accommodation portion 24 has been described, but this is merely an example. The magnet 32A and the magnetized member 32B may be provided at other positions, or may be provided at a plurality of locations.

The holding mechanism 32 consisting of the magnet 32A and the magnetized member 32B has been described as an example, but the technology of the present disclosure is not limited thereto. The holding mechanism 32 may be any mechanism that generates a holding force for holding in the accommodated state, a snap fit that generates a holding force by mechanical engagement may be used, or a lid that covers the accommodation portion 24 may be provided.

In a state in which the remote operation unit 12 is accommodated, a height of an outer edge portion of the back surface 12B of the remote operation unit 12 is set to be the same as a height h of the rear surface 11B of the device main body 11. That is, the back surface 12B and the rear surface 11B are in a so-called flush state. Here, the height h is a distance from a bottom surface 34E of the accommodation portion 24 to an outer peripheral surface of the device main body 11 on which the accommodation portion 24 is formed, in a recessed shape of the accommodation portion 24. In the present example, since the accommodation portion 24 is formed on the rear surface 11B in the outer peripheral surfaces of the device main body 11, the height h is a distance from the bottom surface 34E to the rear surface 11B. Here, the same height refers to a state in which the outer edge portion of the back surface 12B does not protrude from or sink into the rear surface 11B of the device main body 11.

A region (for example, a central portion) other than the outer edge portion of the back surface 12B of the remote operation unit 12 does not have to be at the same height as the rear surface 11B. For example, the region other than the outer edge portion of the back surface 12B may be recessed from the outer edge portion or may protrude from the outer edge portion.

Figure 5:
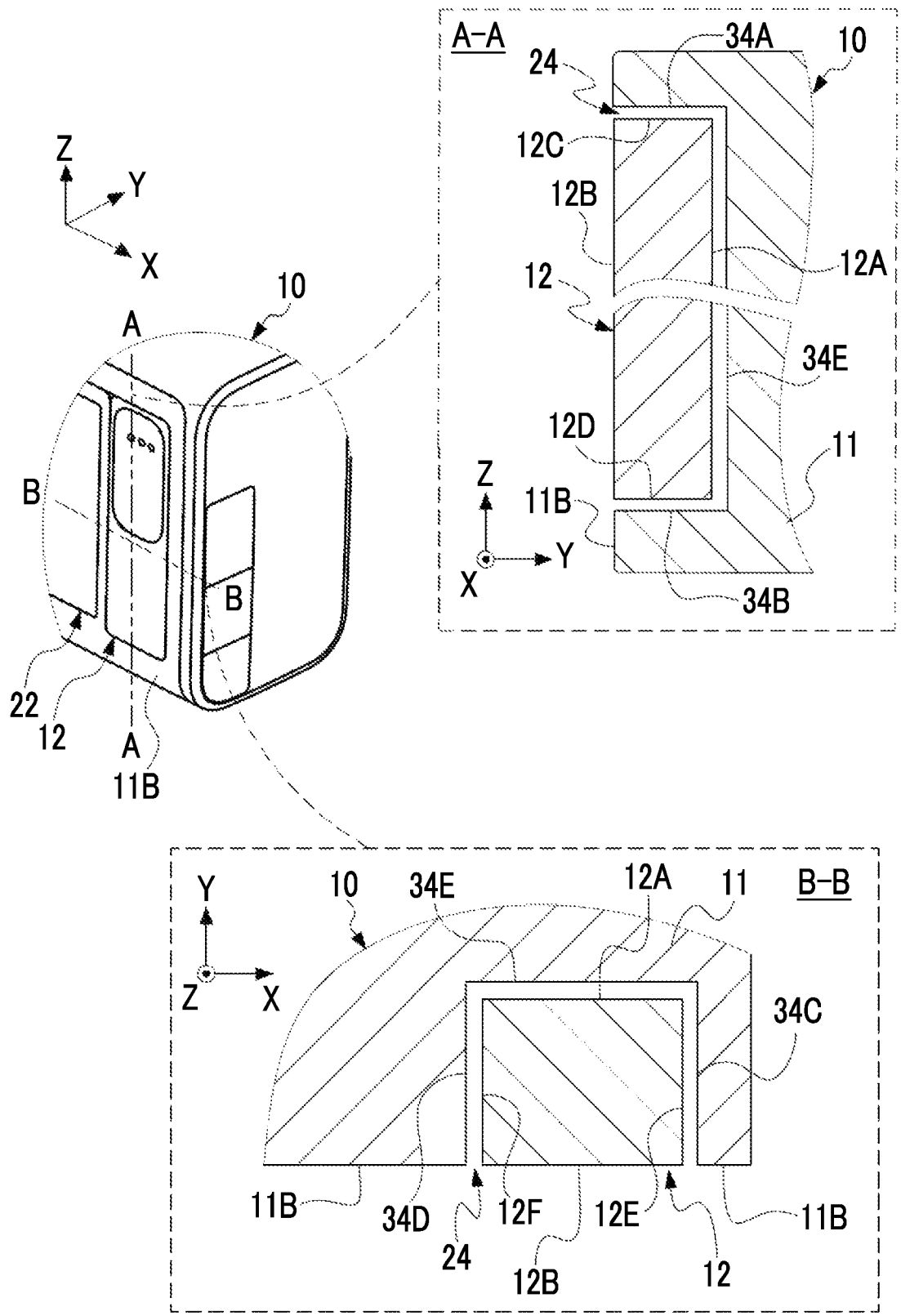
FIG. 5 is a partially enlarged view showing an example of the configuration of the radiation irradiation device.

As shown in FIG. 5 as an example, the accommodation portion 24 accommodates the remote operation unit 12 in a state in which an entire region of the entire surface excluding the back surface 12B is covered with the inner wall surface 34. The inner wall surface 34 includes, for example, an upper surface 34A, a lower surface 34B, a right side surface 34C, a left side surface 34D, and a bottom surface 34E. In addition, the remote operation unit 12 comprises the operation surface 12A, an upper surface 12C, a lower surface 12D, a right side surface 12E, and a left side surface 12F as the entire surface excluding the back surface 12B.

As shown in a cross-sectional view taken along the line A-A in FIG. 5, the upper surface 34A of the accommodation portion 24 faces the upper surface 12C of the remote operation unit 12 in a state in which the remote operation unit 12 is accommodated. Further, the lower surface 34B of the accommodation portion 24 faces the lower surface 12D of the remote operation unit 12. Further, the bottom surface 34E of the accommodation portion 24 faces the operation surface 12A of the remote operation unit 12.

As shown in a cross-sectional view taken along the line B-B in FIG. 5, the right side surface 34C of the accommodation portion 24 faces the right side surface 12E of the remote operation unit 12 in a state in which the remote operation unit 12 is accommodated. Further, the left side surface 34D of the accommodation portion 24 faces the left side surface 12F of the remote operation unit 12. As described above, the accommodation portion 24 accommodates the remote operation unit 12 in a state in which the entire region of the entire surface excluding the back surface 12B is covered with the inner wall surface 34.

As described above, the radiation irradiation device 10 according to the present embodiment comprises the accommodation portion 24 that accommodates the remote operation unit 12 in the form of being embedded in the rear surface 11B of the device main body 11 and includes the recessed inner wall surface 34 facing the entire surface excluding the back surface 12B of the remote operation unit 12. As a result, the remote operation unit 12 can be accommodated in a stable state as compared with a case where the remote operation unit 12 is accommodated in a state in which a plurality of surfaces of the remote operation unit 12 are exposed.

For example, in a case where the remote operation unit 12 is attached to the device main body 11 via only one surface (that is, an attachment surface), surfaces of the remote operation unit 12 other than the attachment surface are exposed to the outside. For this reason, the remote operation unit 12 easily comes into contact with the outside and is not supported by the device main body 11 on the surfaces other than the attachment surface, so that the remote operation unit 12 easily falls off from the device main body 11. On the other hand, in the present configuration, the remote operation unit 12 is accommodated in the form of being embedded in the device main body 11 and is accommodated in the accommodation portion 24 having the recessed inner wall surface 34 facing the entire surface excluding the back surface 12B of the remote operation unit 12. Accordingly, in the accommodated state of the remote operation unit 12, surfaces, which are exposed to the outside, in the outer peripheral surface of the remote operation unit 12 are reduced in comparison with the related art. Therefore, it is possible to accommodate the remote operation unit 12 in a stable state.

Further, in the radiation irradiation device 10 according to the present embodiment, the irradiation button 13A and the imaging button 13B are provided on the operation surface 12A, and the operation button is not provided on the back surface 12B which is a surface opposite to the operation surface 12A. In the accommodated state, the entire surface excluding the back surface 12B faces the inner wall surface 34 of the accommodation portion 24. In other words, the back surface 12B is exposed to the outside. Accordingly, it is possible to prevent the user from erroneously operating the remote operation unit 12 in the accommodated state of the remote operation unit 12.

Further, in the radiation irradiation device 10 according to the present embodiment, the outer edge portion of the operation surface 12A has the same height as the rear surface 11B of the device main body 11. Accordingly, in the accommodated state, the remote operation unit 12 and the device main body 11 become more integrated in appearance in comparison with the related art, and the appearance of the radiation irradiation device 10 in a state in which the remote operation unit 12 is accommodated is improved.

In addition, in the radiation irradiation device 10 according to the present embodiment, the entire region of the entire surface of the remote operation unit 12 other than the back surface 12B is covered with the inner wall surface 34 in the accommodated state. Accordingly, this may be advantageous in terms of appearance in a state in which the remote operation unit 12 is accommodated and prevention of the remote operation unit 12 from falling off.

Further, in the radiation irradiation device 10 according to the present embodiment, the holding mechanism 32 that holds the accommodated state in which the remote operation unit 12 is accommodated in the accommodation portion 24 is provided. Since the accommodated state is held by the holding mechanism 32, a risk that the remote operation unit 12 falls off from the accommodation portion 24 is reduced, and the remote operation unit 12 can be accommodated in a stable state.

Further, in the radiation irradiation device 10 according to the present embodiment, the accommodation portion 24 is provided on a surface other than the front surface 11A of the device main body 11 where the irradiation window 28 for the radiation R is provided. Accordingly, in a case of attaching and detaching the remote operation unit 12, erroneous exposure to the radiation R is suppressed.

For example, in a case of removing the remote operation unit 12, the user holds the device main body 11 in a posture facing the outer peripheral surface of the device main body 11 provided with the accommodation portion 24 and performs an act of removing the remote operation unit 12 in that state. Therefore, in a case where the accommodation portion 24 is provided on the front surface 11A on which the irradiation window 28 is provided, since the irradiation window 28 also faces the user, there is a concern of erroneous exposure due to an erroneous operation or the like. In a case where the accommodation portion 24 is provided on a surface different from the irradiation window 28, such a concern is suppressed.

Further, in the radiation irradiation device 10 according to the present embodiment, the accommodation portion 24 is provided on the rear surface 11B opposite to the front surface 11A on which the irradiation window 28 is provided. As a result, in a case of attaching and detaching the remote operation unit 12, erroneous exposure to the radiation R is further suppressed.

First Modification Example

In the above embodiment, an example of a form in which the entire region of the entire surface of the remote operation unit 12 other than the back surface 12B is covered with the inner wall surface 34 in the accommodated state has been described, but the technology of the present disclosure is not limited thereto. In the first modification example, a part of the entire surface of the remote operation unit 12 other than the back surface 12B is covered with the inner wall surface 34 in the accommodated state.

Figure 6:
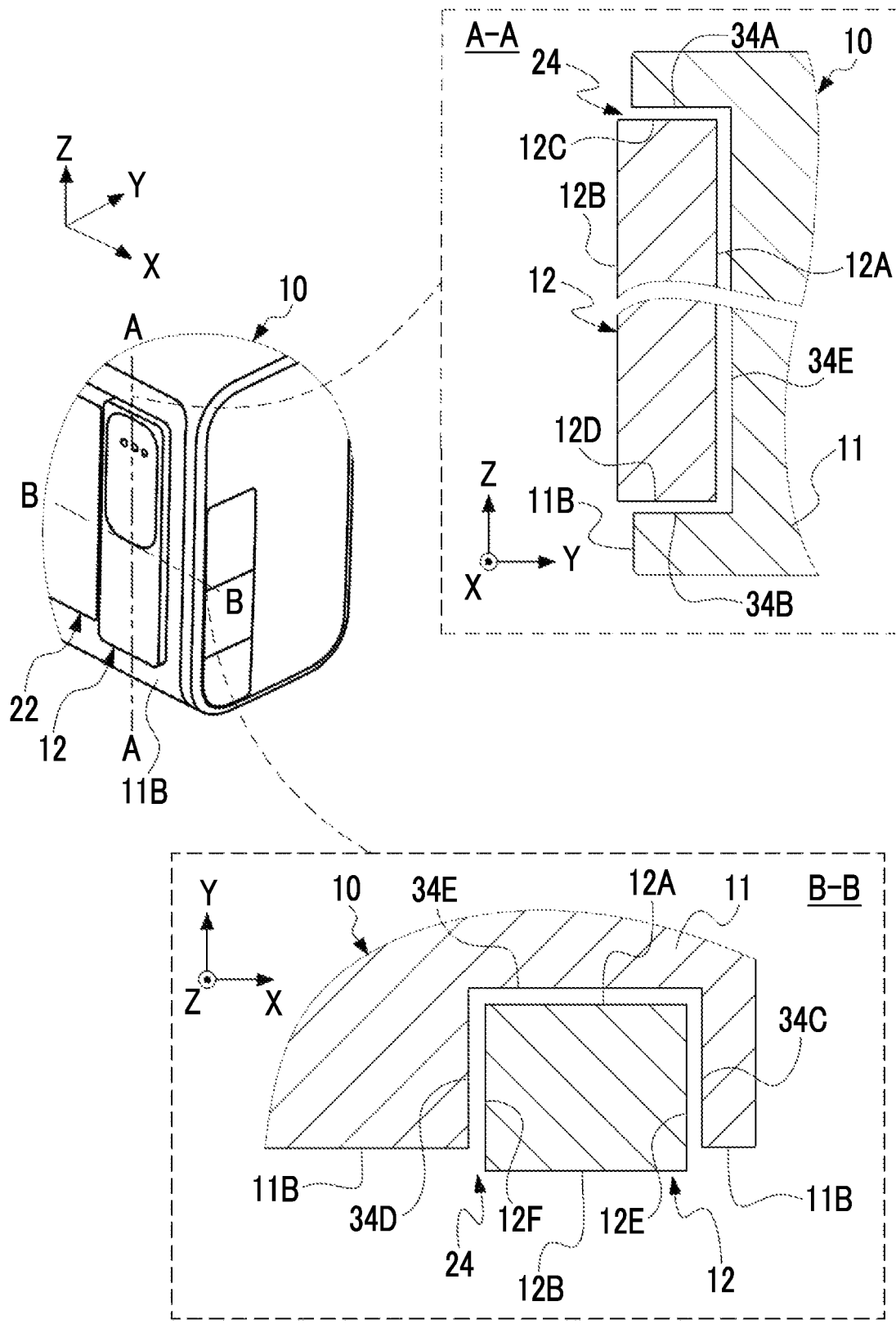
FIG. 6 is a partially enlarged view showing an example of the configuration of the radiation irradiation device.

As shown in FIG. 6 as an example, in the accommodated state of the remote operation unit 12, the remote operation unit 12 is accommodated in the accommodation portion 24 in a state of protruding from the rear surface 11B. The upper surface 34A of the accommodation portion 24 faces a part of the upper surface 12C of the remote operation unit 12. The lower surface 34B of the accommodation portion 24 faces a part of the lower surface 12D of the remote operation unit 12.

Further, the right side surface 34C of the accommodation portion 24 faces a part of the right side surface 12E of the remote operation unit 12, and the left side surface 34D of the accommodation portion 24 faces a part of the left side surface 12F of the remote operation unit 12. As described above, in the accommodated state, a part of the entire surface of the remote operation unit 12 other than the back surface 12B is covered with the inner wall surface 34.

As described above, in the radiation irradiation device 10 according to the first modification example, a part of the entire surface of the remote operation unit 12 other than the back surface 12B is covered with the inner wall surface 34 in the accommodated state. In other words, in the accommodated state, the remote operation unit 12 is accommodated in a state of protruding from the rear surface 11B of the device main body 11. Accordingly, the user can easily take out the remote operation unit 12 from the device main body 11.

Second Modification Example

In the above embodiment, an example of a form in which the back surface 12B of the remote operation unit 12 is exposed to the outside in the accommodated state of the remote operation unit 12 has been described, but the technology of the present disclosure is not limited thereto. In the second modification example, the operation surface 12A of the remote operation unit 12 is exposed to the outside in the accommodated state of the remote operation unit 12.

Figure 7:
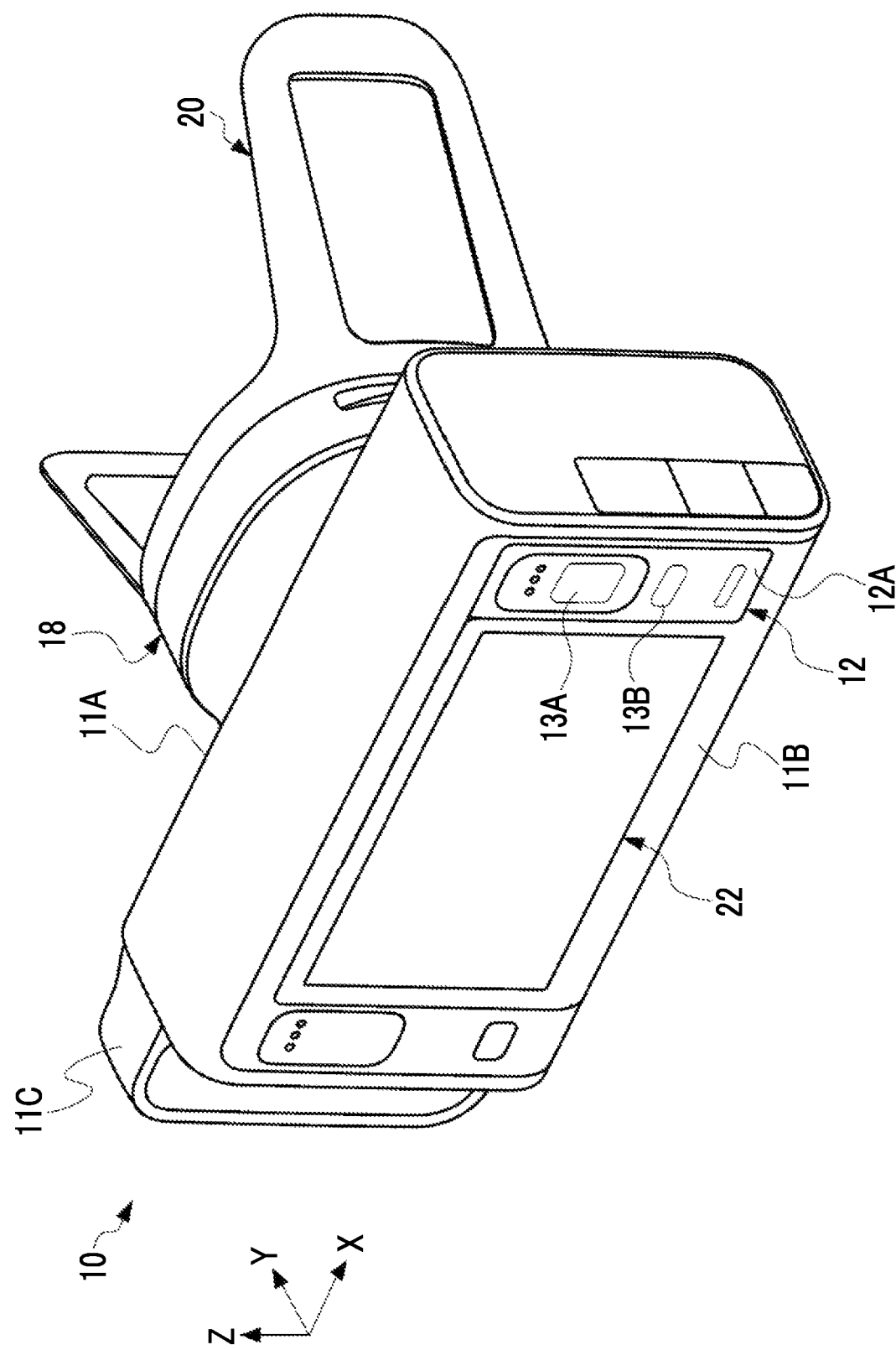
FIG. 7 is an external perspective view showing an example of the configuration of the radiation irradiation device.

As shown in FIG. 7 as an example, the remote operation unit 12 is accommodated in the accommodation portion 24 in the form of being embedded in the device main body 11. In the accommodated state, only the operation surface 12A of the remote operation unit 12 is exposed to the outside. In other words, the inner wall surface 34 of the accommodation portion 24 faces the entire surface excluding the operation surface 12A in the outer peripheral surface of the remote operation unit 12. The irradiation button 13A and the imaging button 13B are provided on the operation surface 12A. The operation surface 12A is an example of "one surface" according to the technology of the present disclosure, and the irradiation button 13A and the imaging button 13B are examples of "operation keys" according to the technology of the present disclosure.

As described above, in the radiation irradiation device 10 according to the second modification example, the irradiation button 13A and the imaging button 13B are provided on the operation surface 12A. In the accommodated state, the entire surface excluding the operation surface 12A faces the inner wall surface 34 of the accommodation portion 24. In other words, the operation surface 12A is exposed to the outside. Accordingly, in the accommodated state of the remote operation unit 12, the user B can perform an operation via the operation surface 12A.

Third Modification Example

Figure 8:
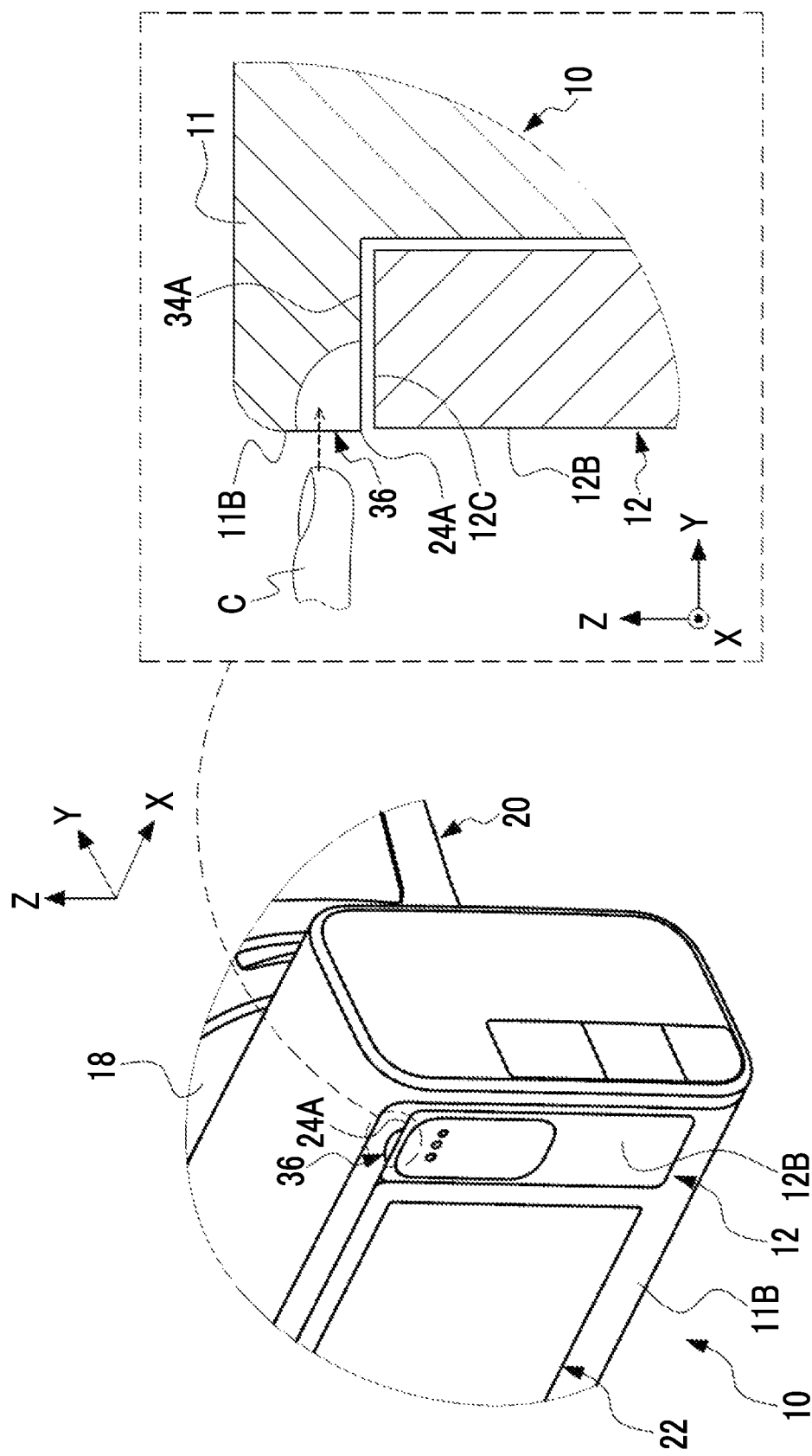
FIG. 8 is a partially enlarged view showing an example of the configuration of the radiation irradiation device.

In the third modification example, a recess 36 for finger hook is provided in a part of an inner peripheral edge 24A of the accommodation portion 24. As shown in FIG. 8 as an example, in the accommodation portion 24, the recess 36 is provided in the upper surface 34A which is a surface facing the upper surface 12C of the remote operation unit 12. The recess 36 is a region having a recess shape formed from the rear surface 11B to the accommodation portion 24. The inner peripheral edge 24A is an example of an "inner peripheral edge" according to the technology of the present disclosure, and the recess 36 is an example of a "recess" according to the technology of the present disclosure.

The user can insert a finger C into the recess 36 and place the finger C on the upper surface 12C of the remote operation unit 12. As a result, since the remote operation unit 12 can be pulled down to the outside of the device main body 11 with the finger C, it is easy to take out the remote operation unit 12 from the accommodation portion 24.

Although an example of a form in which the recess 36 is provided on the upper surface 34A of the accommodation portion 24 has been described here, this is merely an example.

The shape, size, and disposition of the recess 36 are not particularly limited, and may be any shape, size, and disposition that make it easy to take out the remote operation unit 12.

As described above, in the radiation irradiation device 10 according to the third modification example, since the recess 36 is provided on the inner peripheral edge 24A of the accommodation portion 24, it is easy to attach and detach the remote operation unit 12 to and from the device main body 11 by the user inserting the finger C.

Fourth Modification Example

In the above embodiment, an example of a form in which the accommodation portion 24 is provided on the rear surface 11B has been described, but the technology of the present disclosure is not limited thereto. In the fourth modification example, the accommodation portion 24 is provided on the upper surface 11D of the device main body 11.

Figure 9:
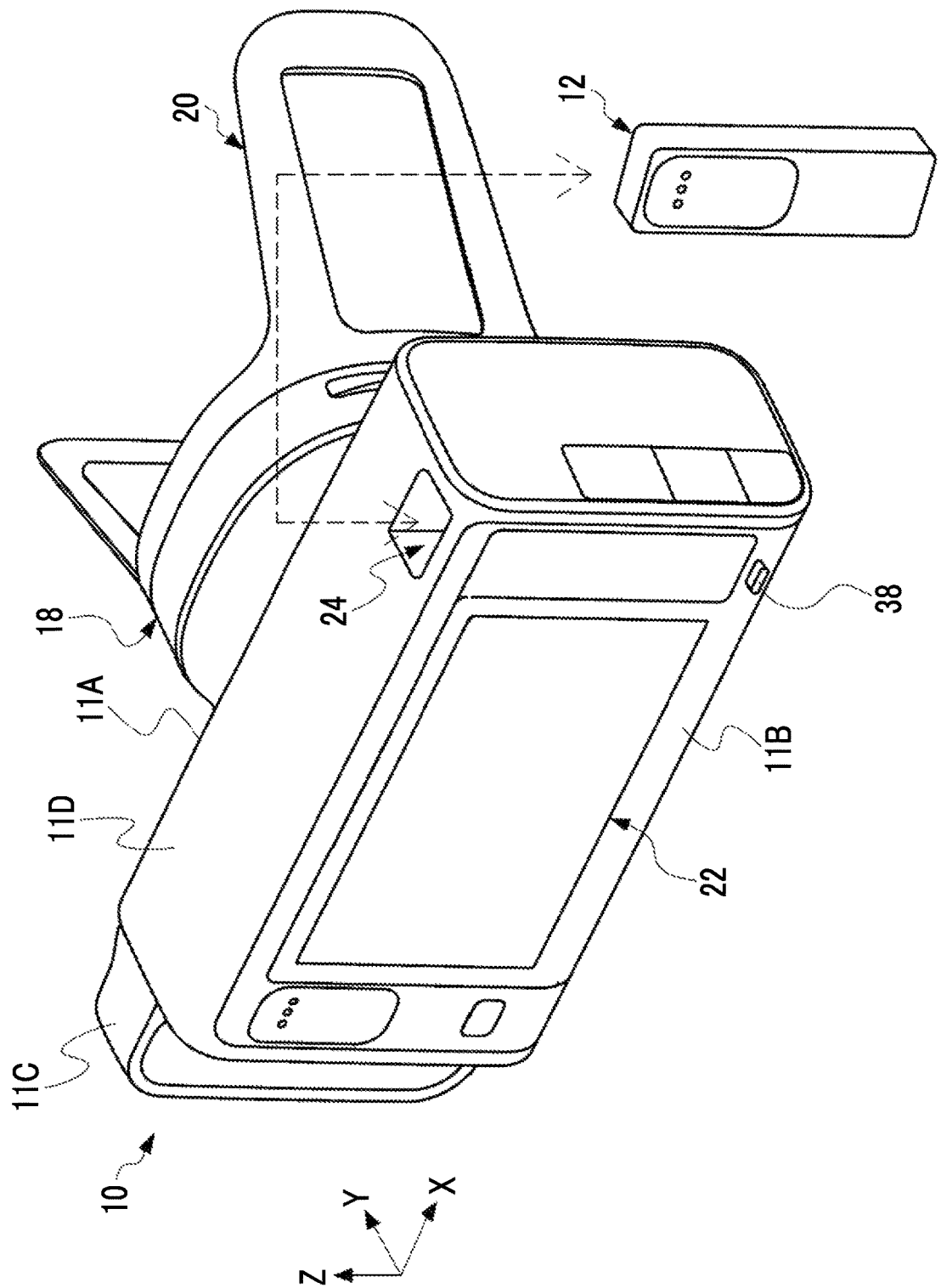
FIG. 9 is an external perspective view showing an example of the configuration of the radiation irradiation device.

As shown in FIG. 9 as an example, an opening of the accommodation portion 24 is provided on the upper surface 11D of the device main body 11. The accommodation portion 24 has a recessed shape having a depth along an up-down direction of the device main body 11. The remote operation unit 12 is inserted into the accommodation portion 24 from the opening of the upper surface 11D. In this case, the remote operation unit 12 is inserted into the accommodation portion 24 along a longitudinal direction of the remote operation unit 12. Accordingly, the remote operation unit 12 is accommodated in the accommodation portion 24 in the form of being embedded in the device main body 11. The remote operation unit 12 is held in the accommodated state in the accommodation portion 24 by the holding mechanism 32 (see FIG. 4).

Further, the device main body 11 comprises a release switch 38 that is used to release the holding of the remote operation unit 12 in the accommodation portion 24. The release switch 38 is provided outside the accommodation portion 24. In the example shown in FIG. 9, the release switch 38 is provided on the rear surface 11B of the device main body 11. The release switch 38 is an example of an "operation key" according to the technology of the present disclosure.

Figure 10:
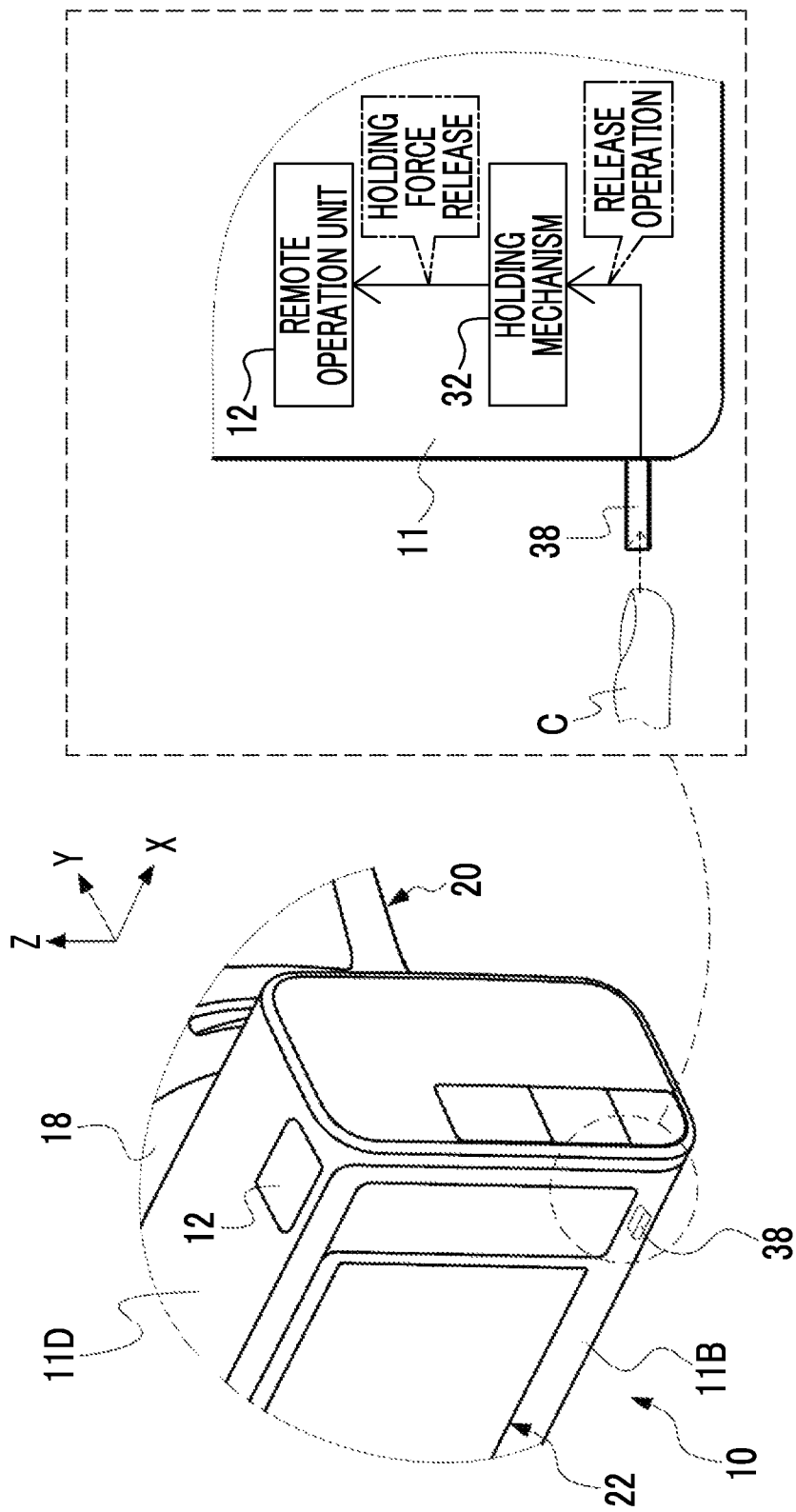
FIG. 10 is a partially enlarged view showing an example of the configuration of the radiation irradiation device.

As shown in FIG. 10 as an example, in a case where the release switch 38 is pressed via the finger C of the user, the holding force of the remote operation unit 12 in the accommodation portion 24 by the holding mechanism 32 is released. For example, in a case where holding is performed using a magnet in the holding mechanism 32 (see FIG. 4), a distance between the magnet and the magnetized member is increased in response to an operation of the release switch 38, whereby the holding force is released. With the release of the holding force by the holding mechanism 32, the remote operation unit 12 can be taken out from the accommodation portion 24.

Although an example of a form in which the holding force of the holding mechanism 32 is released by the release switch 38 has been described here, the technology of the present disclosure is not limited thereto. For example, the holding force of the holding mechanism 32 may be released by an operation of pushing the remote operation unit 12 toward the back (downward in the example shown in FIG. 10) of the accommodation portion 24.

As described above, in the radiation irradiation device 10 according to the fourth modification example, since the accommodated state of the remote operation unit 12 is released by operating the release switch 38, it becomes easy to remove the remote operation unit 12 from the device main body 11. For example, as shown in FIG. 10, it is effective in a case where the remote operation unit 12 is accommodated in the form of being completely embedded in the accommodation portion 24.

In the fourth modification example, the operation button, such as the irradiation button 13A, may be provided on the upper surface 12C of the remote operation unit 12. Accordingly, it is realized to operate the remote operation unit 12 in a state in which the remote operation unit 12 is accommodated in the accommodation portion 24.

Figure 11:
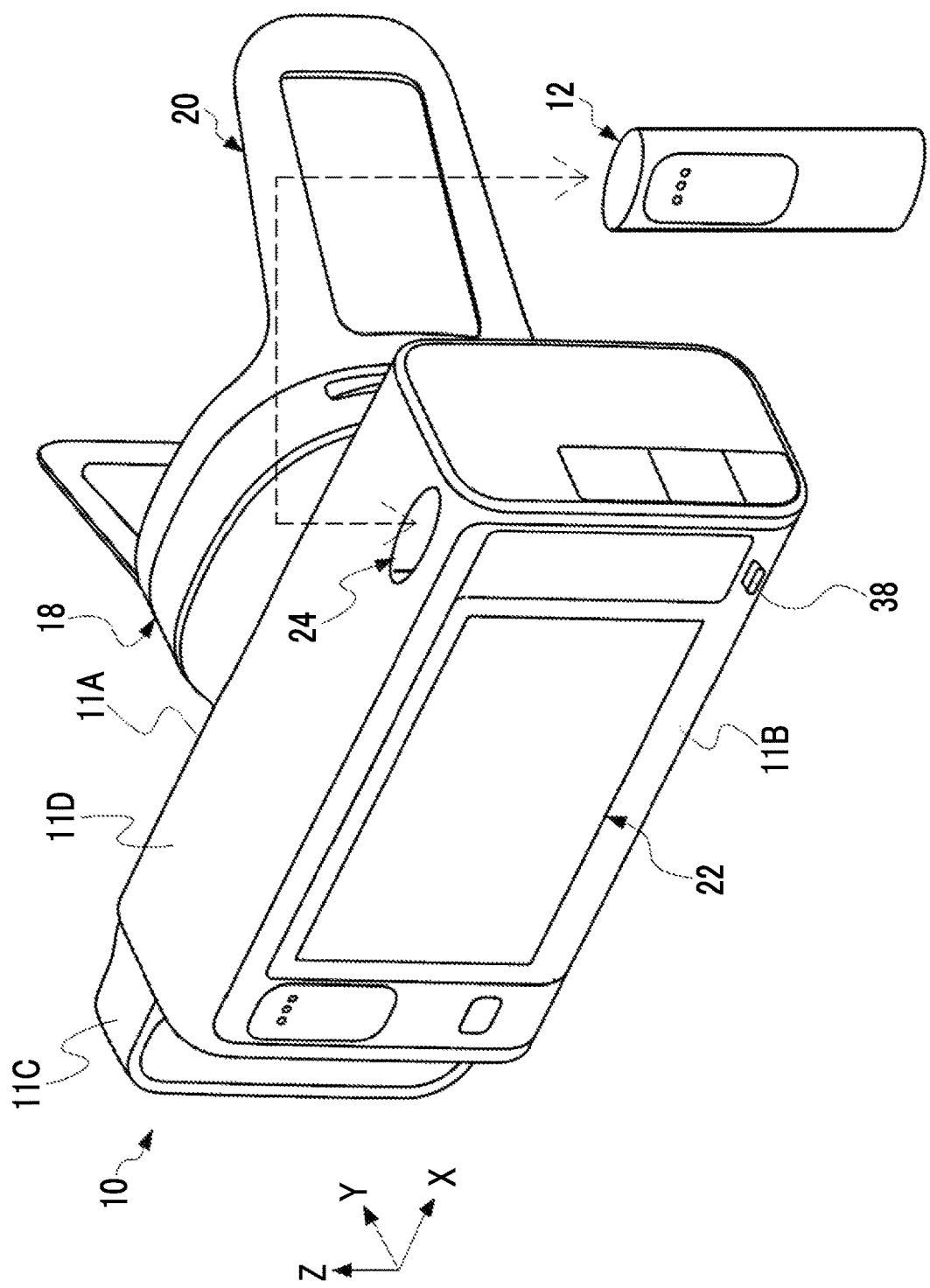
FIG. 11 is an external perspective view showing an example of the configuration of the radiation irradiation device.

In the fourth modification example, although an example of a form in which the shape of the remote operation unit 12 is a substantially rectangular parallelepiped shape has been described, the technology of the present disclosure is not limited thereto. As shown in FIG. 11 as an example, the remote operation unit 12 may have a columnar shape. The columnar remote operation unit 12 is accommodated in the accommodation portion 24 from the opening provided on the upper surface 11D of the device main body 11. The accommodation portion 24 is formed in a columnar recessed shape corresponding to the shape of the remote operation unit 12.

Figure 12:
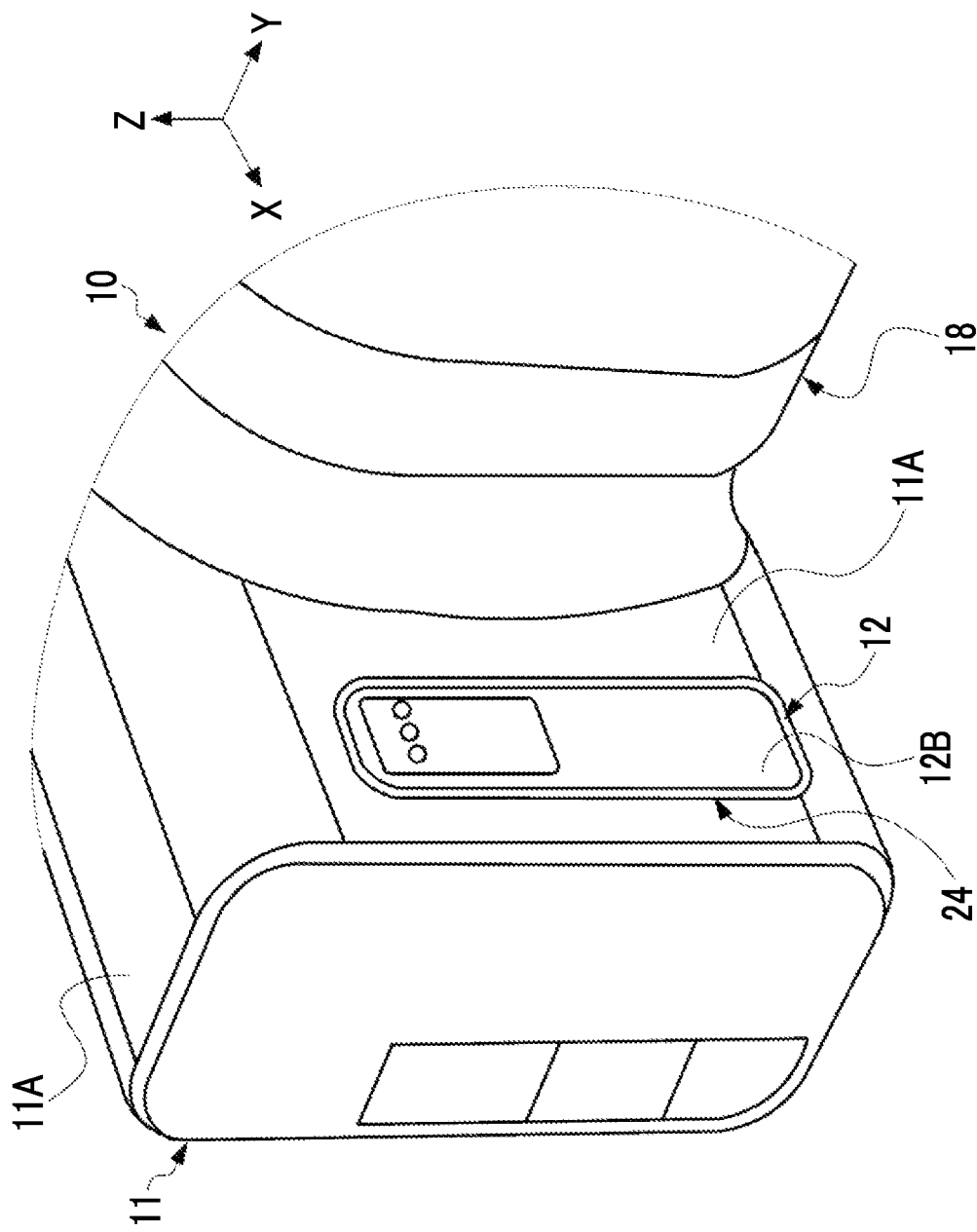
FIG. 12 is a partially enlarged view showing an example of the configuration of the radiation irradiation device.

In the above embodiment, an example of a form in which the accommodation portion 24 is provided on the rear surface 11B or the upper surface 11D of the device main body 11 has been described, but the technology of the present disclosure is not limited thereto. As shown in FIG. 12 as an example, the accommodation portion 24 may be provided on the front surface 11A of the device main body 11. The remote operation unit 12 is accommodated in the accommodation portion 24 provided on the front surface 11A. Since the accommodation portion 24 is provided on the front surface 11A of the device main body 11, the user can easily understand an accommodation situation of the remote operation unit 12. In addition, the accommodation portion 24 may be provided on the right side surface or the left side surface of the device main body 11. In addition, a plurality of the accommodation portions 24 may be provided.

In the above embodiment, an example of a form in which the remote operation unit 12 has a rectangular parallelepiped shape has been described, but the technology of the present disclosure is not limited thereto. The remote operation unit 12 may be partially composed of a curved surface.

Figure 13:
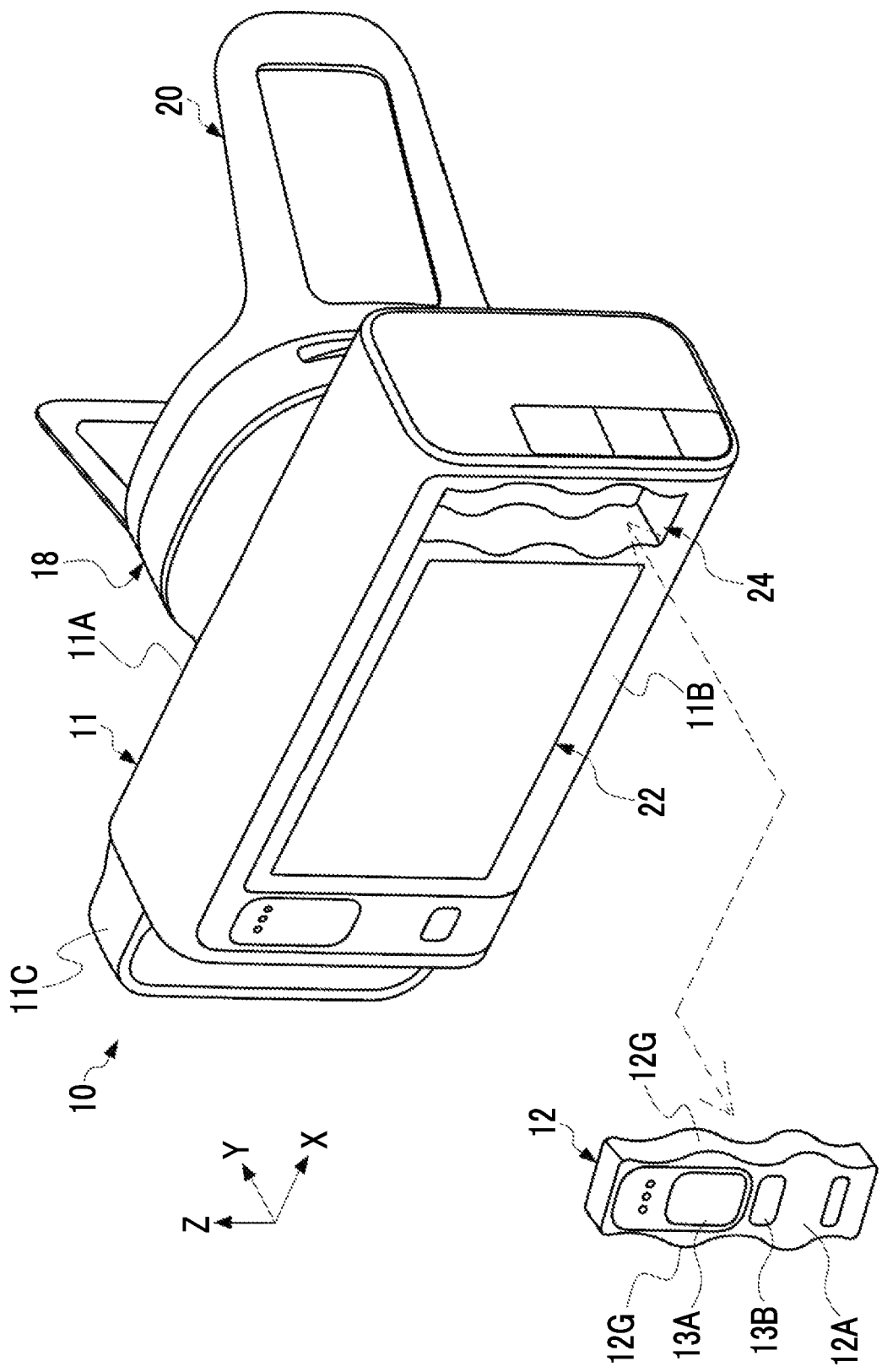
FIG. 13 is an external perspective view showing an example of the configuration of the radiation irradiation device.

As shown in FIG. 13 as an example, the remote operation unit 12 comprises a finger hook portion 12G on a side surface. The finger hook portion 12G is a curved surface in a wavy shape in a case where the remote operation unit 12 is viewed from a normal direction of the operation surface 12A. The finger hook portion 12G is hooked by a finger (not shown) of the user, making it easier to grip the remote operation unit 12 and preventing the remote operation unit 12 from falling accidentally. In this case, the accommodation portion 24 of the device main body 11 has a recessed shape that matches the curved surface of the finger hook portion 12G of the remote operation unit 12.

The above-described contents and illustrated contents are detailed descriptions of parts related to the technology of the present disclosure, and are merely examples of the technology of the present disclosure. For example, the above descriptions related to configurations, functions, operations, and advantageous effects are descriptions related to examples of configurations, functions, operations, and advantageous effects of the parts related to the technology of the present disclosure. Therefore, it is needless to say that unnecessary parts may be deleted, or new elements may be added or replaced with respect to the above-described contents and illustrated contents within a scope not departing from the spirit of the technology of the present disclosure. In order to avoid complication and easily understand the parts according to the technology of the present disclosure, in the above-described contents and illustrated contents, common technical knowledge and the like that do not need to be described to implement the technology of the present disclosure are not described.

All documents, patent applications, and technical standards described in the present specification are incorporated in the present specification by reference to the same extent as in a case where each document, patent application, and technical standard are specifically and individually noted to be incorporated by reference.

Furthermore, the following appendices will be disclosed in relation to the above-described embodiment.

Appendix 1

A radiation irradiation device comprising: a device main body that is provided with an irradiation window for emitting radiation; a remote operation unit that is capable of remotely operating the device main body and of which an outer peripheral surface is composed of a plurality of surfaces; and an accommodation portion that is provided in the device main body, accommodates the remote operation unit in a form of being embedded in a main body outer peripheral surface, which is an outer peripheral surface of the device main body, and has a recessed inner wall surface facing an entire surface excluding one surface in the outer peripheral surface of the remote operation unit.

Appendix 2

The radiation irradiation device according to Appendix 1, in which an operation key for inputting an operation instruction is provided on the one surface.

Appendix 3

The radiation irradiation device according to Appendix 1, in which an operation key for inputting an operation instruction is not provided on the one surface, and the operation key is provided on a surface other than the one surface.

Appendix 4

The radiation irradiation device according to any one of Appendices 1 to 3, in which at least an outer edge portion of the one surface has the same height as the main body outer peripheral surface in a state in which the remote operation unit is accommodated in the accommodation portion.

Appendix 5

The radiation irradiation device according to any one of Appendices 1 to 4, in which at least a part of an inner peripheral edge of the accommodation portion is provided with a recess for finger hook.

Appendix 6

The radiation irradiation device according to any one of Appendices 1 to 3, in which the accommodation portion accommodates the remote operation unit in a state in which an entire region of the entire surface excluding the one surface is covered with the inner wall surface.

Appendix 7

The radiation irradiation device according to any one of Appendices 1 to 6, in which the device main body includes a holding mechanism that holds the remote operation unit in an accommodated state of being accommodated in the accommodation portion.

Appendix 8

The radiation irradiation device according to Appendix 7, in which a holding force of the holding mechanism for holding the remote operation unit is released by a pushing operation of pushing the remote operation unit toward a back of the accommodation portion or by an operation of an operation key disposed outside the accommodation portion.

Appendix 9

The radiation irradiation device according to any one of Appendices 1 to 8, in which in a case where a surface on which the irradiation window is provided in the main body outer peripheral surface is defined as a front surface, the accommodation portion is provided on a surface other than the front surface in the main body outer peripheral surface.

Appendix 10

The radiation irradiation device according to Appendix 9, in which the accommodation portion is provided on a rear surface on a side opposite to the front surface.

Appendix 11

The radiation irradiation device according to any one of Appendices 1 to 8, in which in a case where a surface on which the irradiation window is provided in the main body outer peripheral surface is defined as a front surface, the accommodation portion is provided on the front surface in the main body outer peripheral surface.

What is claimed is:

1. A radiation irradiation device comprising:
a device main body that is provided with an irradiation window for emitting radiation;
a remote operation unit that is capable of remotely operating the device main body and having an outer peripheral surface composed of a plurality of surfaces; and
an accommodation portion that is provided in the device main body, accommodates the remote operation unit in a form of being embedded in a main body outer peripheral surface, which is an outer peripheral surface of the device main body, and has a recessed inner wall surface facing an entire surface of the outer peripheral surface of the remote operation unit except one exposed surface,
wherein, among outer surfaces of the device main body, a surface provided with the irradiation window is defined as a front surface and a surface opposite thereto is defined as a rear surface, and the accommodation portion is provided on the rear surface,
the remote operation unit includes an irradiation button, and
the irradiation button is provided on a surface other than the exposed surface, and, when the remote operation unit is accommodated in the accommodation portion, the irradiation button is located within the accommodation portion and is not directly operable from outside, and irradiation of the radiation is commanded by operation of the irradiation button.

2. The radiation irradiation device according to claim 1, wherein at least an outer edge portion of the one surface has the same height as the main body outer peripheral surface in a state in which the remote operation unit is accommodated in the accommodation portion.

3. The radiation irradiation device according to claim 1, wherein at least a part of an inner peripheral edge of the accommodation portion is provided with a recess for finger hook.

4. The radiation irradiation device according to claim 1, wherein the accommodation portion accommodates the remote operation unit in a state in which an entire region of the entire surface excluding the one surface is covered with the inner wall surface.

5. The radiation irradiation device according to claim 1, wherein the device main body includes a holding mechanism that holds the remote operation unit in an accommodated state of being accommodated in the accommodation portion.

6. The radiation irradiation device according to claim 5, wherein a holding force of the holding mechanism for holding the remote operation unit is released by a pushing operation of pushing the remote operation unit toward a back of the accommodation portion or by an operation of an operation key disposed outside the accommodation portion.

* * * * *